United States Patent [19]

Reilly

[11] Patent Number: 4,886,125
[45] Date of Patent: Dec. 12, 1989

[54] ACCURATE LIGHTWEIGHT MANUAL LAWN AND GARDEN WEED CHIPPER

[76] Inventor: Hugh M. Reilly, P.O. Box 224, Runaway Bay, Gold Coast, Australia, 4216

[21] Appl. No.: 119,266

[22] Filed: Nov. 9, 1987

Related U.S. Application Data

[63] Continuation of Ser. No. 796,019, filed as PCT AU84/00199 on Oct. 12, 1984, published as WO86/02233 on Apr. 24, 1986, abandoned.

[51] Int. Cl.[4] .............................. A01B 1/10; A01B 1/22
[52] U.S. Cl. ...................................... 172/371; 30/318; 30/296.1; 403/273; 403/282; 29/148.3
[58] Field of Search ............... 172/371, 374, 375, 378, 172/380; 30/279, 300, 309, 310, 318, 340, 342, DIG. 6, 296 R; 403/277, 280, 282, 284, 273, 109

[56] References Cited

U.S. PATENT DOCUMENTS

| 258,733 | 5/1882 | Ezard | 403/282 X |
|---|---|---|---|
| 1,367,380 | 2/1921 | Haas | 30/318 |
| 1,388,657 | 8/1921 | Macdonald et al. | 403/277 X |
| 1,411,435 | 4/1922 | Hosmer | 172/371 |
| 1,532,570 | 4/1925 | Basmaison | 30/DIG. 6 X |
| 1,679,806 | 8/1928 | Bockstadter | 30/318 |
| 1,685,141 | 9/1928 | Schaefer | 30/318 |
| 1,878,689 | 9/1932 | Flack | 30/318 |
| 1,992,287 | 2/1935 | Byars | 30/279 A |
| 2,828,543 | 4/1958 | Valentine | 30/318 X |
| 2,969,120 | 1/1961 | Randolph | 172/371 |
| 3,002,319 | 10/1961 | Laughlin | 30/318 X |
| 3,341,261 | 9/1967 | Fenlin | 403/280 X |
| 4,037,668 | 7/1977 | Svejda | 172/371 |
| 4,258,473 | 3/1981 | Gutekunst | 30/318 |
| 4,375,299 | 3/1983 | Laven | 30/318 X |
| 4,388,013 | 6/1983 | Bergheim et al. | 403/277 |
| 4,715,739 | 12/1987 | Rüegg et al. | 403/273 X |

FOREIGN PATENT DOCUMENTS

| 118671 | 6/1944 | Australia | 30/318 |
|---|---|---|---|
| 225094 | 6/1958 | Australia . | |
| 0011028 | 4/1980 | European Pat. Off. . | |
| 901886 | 3/1963 | Fed. Rep. of Germany | 403/280 |
| 2330294 | 7/1975 | France . | |
| 2450552 | 11/1980 | France | 30/309 |
| 247625 | 12/1947 | Switzerland | 172/375 |
| 638836 | 12/1978 | U.S.S.R. | 403/280 |
| 958860 | 5/1964 | United Kingdom | 172/371 |
| 1410000 | 10/1975 | United Kingdom . | |
| 1539169 | 1/1979 | United Kingdom | 30/318 |

Primary Examiner—Richard J. Johnson
Assistant Examiner—Jeffrey L. Thompson
Attorney, Agent, or Firm—Nixon & Vanderhye

[57] ABSTRACT

An improved accurate lightweight manual tool to cut suburban lawn and garden weeds efficiently and with little time and effort expended. It is like a miniature hoe half a man's height in length with a very thin very narrow blade, in length four to five times its width (FIG. 5). The chipper's light weight is achieved with a very lightweight conduit handle of any section joined at right angles by a secret joint to a backing plate for the blade and weighted with billet to increase and change the power for weight. A thin shock absorber is bolted between plate and blade by.

The secret joint uses a steel billet driven through the metal plate into the conduit handle thereby expanding the handle against the metal collar and plate which has a self-centering protrusion fitting into a recess in the collar. The permanent right angle secret locking joint uses totally prefinished components.

8 Claims, 3 Drawing Sheets

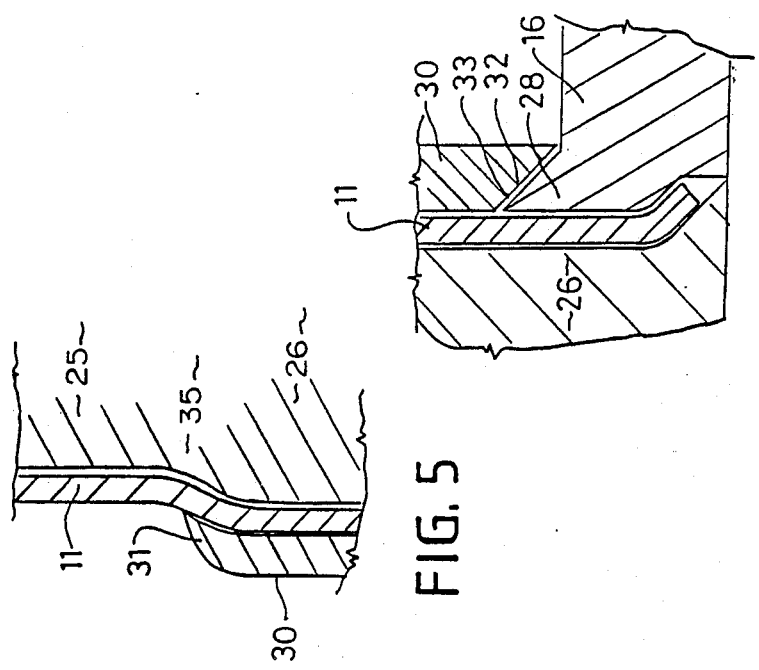
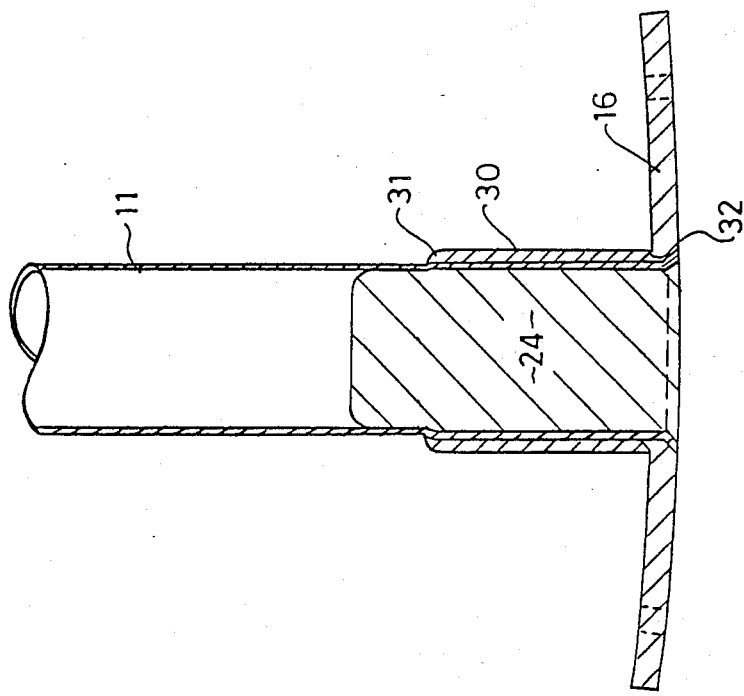

ACCURATE LIGHTWEIGHT MANUAL LAWN AND GARDEN WEED CHIPPER

This application is a continuation of Ser. No. 796,019, filed as PCT AU84/00199 on Oct. 12, 1984, published as WO86/02233 on Apr. 24, 1986, now abandoned.

This invention relates to a gardening implement which will be particularly useful for removing weeds from a lawn.

At present weeds may be removed by either digging them out, poisoning them or by chipping them from the soil with a hoe. A hoe is a relatively heavy implement which an older gardener may find tiring to use. Conventional hoes are heavy because they comprise a heavy blade connected to a heavy handle.

Many inventions have been designed to facilitate removal of weeds by their roots and these may include complicated systems of digging levers for foot and hand actuation. While thee may be effective in use they leave an unsighly hole in the lawn which requires further attention. In order to overcome these disadvantages some gardeners use chemicals to kill the weeds, however poisioning does not immediately remove the weed and it may result in the poision in chemicals destroying large areas of lawn.

In order to overcome these disadvantages fastidious gardeners may go to the extreme of using a sharp knife to slice off the crown of the weed at ground level. This preserves the lawn or adjacent garden plants but is a tedious operation.

A weed removing chipper has been proposed which utilizes an elongate blade mounted at the end of a relatively short light weight handle so that sharp cutting blows can be delivered to cut off the crown of weeds with little effort. This was achieved by maintaining the weight of the implement concentrated at the cutting end thereof and by providing a relatively narrow blade for maximum cutting effect.

While such implements are relatively effective in use a large proportion of the weight remains concentrated in the handle. This weight can be reduced and the efficiency of such implements increased by forming the handle from light weight tubing.

It is an object of this invention to alleviate the abovementioned disadvantages and to provide a gardening implement which will be reliable and efficient in use. Other objects and advantages of this invention will hereinafter become apparent.

With the foregoing and other objects in view, this invention in one aspect resides broadly in a gardening implement of the type having a handle provided with a hand grip at one end and a mounting assembly at its other end for securing a blade to said handle characterised in that said handle is formed from lightweight tubular material and in that said mounting assembly includes a mounting member having mounting means thereon for detachably securing a chipping blade thereto and being connected to said tubular handle by a relatively heavy elongate insert which passes through said mounting means and into said other end for retention therein.

The lightweight tubing is preferably thin wall tubing or conduit which may be of any suitable section such as square, oval, or circular cross sectional configuration. It could be tapered or stepped if desired. Any suitable form of hand grip may be applied to the handle. For example it may be in the form of the plain end of the tube or in the form of chemically foamed tubular plastics material fitted about the tubing to form a double hand grip. The insert may be in the form of a solid steel billet having a body part which extends through the mounting member and into the tubular handle and an enlarged head part which forms an abutment for retaining the mounting member. The head part may be tapered and be retained within a correspondingly tapered aperture in the mounting member. If desired the head portion may be in the form of a non-tapered annular flange extending about the body part.

The mounting aperture in the mounting member through which the insert passes may be formed whereby it is spaced from the body part of the billet to enable the tubular handle material to pass between the body part and the mounting aperture. For this purpose the mounting aperture may be larger than or smaller than the internal dimensions of the tubular material whereby the tubular handle end may be expanded or contracted to engage within the space between the mounting aperture and the body part.

In a preferred form the billet insert includes a body part having a leading reduced diameter portion adapted to fit slidably within the tubular handle and an intermediate portion which enlarges the end of the handle when it is forced therein. The mounting member may be a flat plate or it may be a curved plate, shaped for example to conform to the circumference of a circle having a radius equal to the length of the handle used and centred on the handle. The insert could be tubular and its outer end could be swaged over the mounting member to retain it. It could also be riveted to the mounting member.

It is also preferred that the mounting assembly be provided with a collar or sleeve which may be slid onto the other end of the tubular handle prior to the intermediate portion of the billet insert being forced into the other end so that the latter is expanded into tight engagement with the collar. Preferably the collar is formed of material having a thicker wall section than the handle. The collar, handle and billet may be so made and arranged that when the billet is forced into the other end it expands the handle end plastically into engagement with the collar which is thereby expanded elastically whereby it will clamp the handle end to the billet. The collar, handle and billet may be made from different types of materials to provide the desired joint. The length of the billet insert may be varied to achieve the weight balance required. The handle may be formed of wood, fibreglass or other plastics material as desired.

In a further aspect this invention resides broadly in a method of securing a mounting member to a lightweight tubular member, the method including securing a mounting member to one end of a lightweight tube, the method including:

(a) forming a collar to fit neatly about said one end;
(b) placing the collar on said one end;
(c) forming an aperture in said mounting member whereby the latter may pass over said one end and abut annual end face of said collar.
(d) forming an elongate billet having an inner end which fits neatly within said tube; an intermediate portion adapted to fit through said aperture and to enlarge said one end when forced therein, and a head portion which will not pass through said aperture;
(e) placing said apertured mounting member over said one end for support by said collar, and
(f) forcing said billet into said open end until said head portion clamps said mounting member to said one end.

In order that this invention may be more readily understood and put into practical effect, reference will now be made to the accompanying drawings which illustrate typical embodiments of the present invention and wherein:

FIG. 4 is a cross sectional view of the blade mounting assembly;

FIG. 5 is an enlarged cross sectional view illustrating the deformation of the tubular handle and the associated collar;

FIG. 6 is an enlarged cross sectional view illustrating the deformation of the tubular handle adjacent the blade mounting plate.

Figure 1:
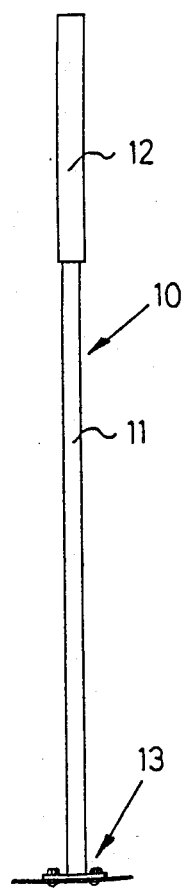
FIG. 1 is a side view of a weed chipping implement.

Referring to FIGS. 1 to 6 it will be seen that the weed chipping implement 10 includes a thin wall tubular handle 11 about one meter in length and extending between a double hand grip 12 at one end and a blade assembly 13 at the other end. The latter includes a blade 14 bolted by bolts 15 to a mounting plate 16 secured to the handle 11 by a concealed mounting assembly.

The cutting blade 14 is a narrow rectangular blade which is preferably formed from thin tool steel. The opposite ends 17 and 18 are sharpened to form opposed cutting edges, one of which extends the full width of the blade and the other being tapered as illustrated. The cutting edges are spaced from the mounting plate 16. The longitudinal side edges 19 of the blade 14 also extend outwardly beyond the mounting plate 16 so as to form a raking edge which may be used to rake material towards the user. Suitably the mounting plate 16 has a length of approximately three to four times its width.

The mounting plate 16 is sufficiently thick so that it will not bend significantly in use as it transfers the jarring action of the blades to the handle 11. The mounting plate 16 is approximately four fifths of the width of the cutting blade 14 which has a length of about five times its width. Clearance size bolting apertures 20 and 21 are provided in the mounting plate 16 and the blade 14 to enable the latter to be rigidly bolted thereto by the bolts 15. However a shock absorbing pad 22 is arranged between the blade 14 and the mounting plate 16 to minimise shock loadings transferred from the blade 14 to the handle 11.

Figure 3:
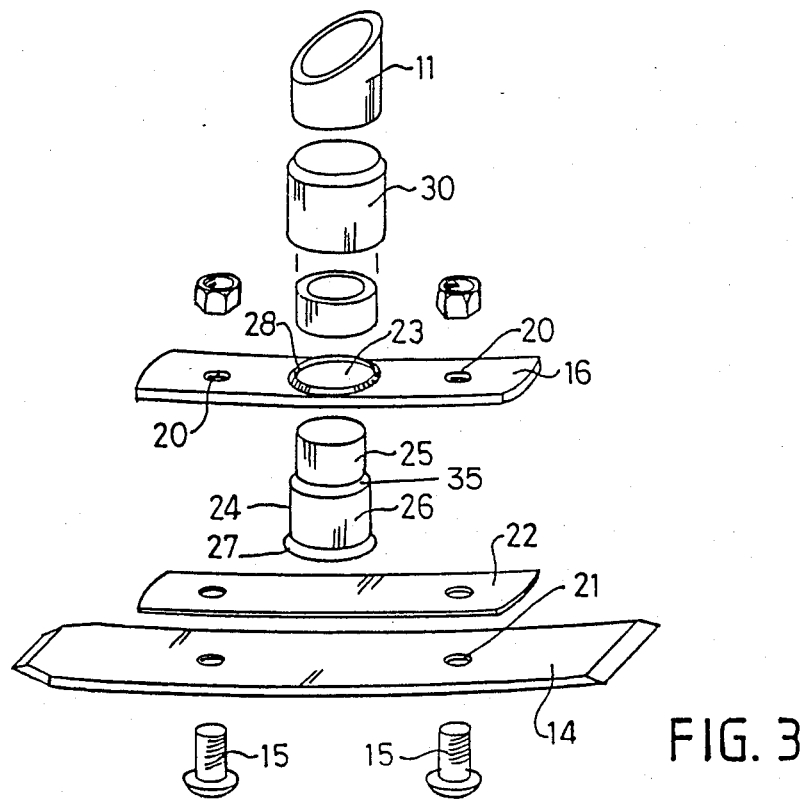
FIG. 3 is an exploded view illustrating the components of the blade mounting assembly.

Referring to FIG. 3 it will be seen that the mounting plate 16 is centrally apertured at 23 so that a solid steel billet insert 24 may pass through the mounting plate 16 into the open end of the tubular handle 11. The billet 24 has a leading part 25 which is formed to slide freely within the handle 11 and enlarged intermediate part 26 which expands the end of the handle 11 when it is forced therein. The intermediate part 26 is terminated by an enlarged tapered head part 27 which is adapted to be received in the correspondingly tapered aperture 23. The latter is formed in a stamping or punching process so that the lower peripheral portion of the mounting plate 16 about the aperture 23 extends downwardly to provide a tapered annular protrusion 28.

A retaining collar or sleeve 30 is disposed about the end porton of the handle 11 and it is formed with complementary tapered end faces 31 and 32. As shown in FIG. 6, the end face 32 forms a tapered annular recess 33 about the handle 11 in which the tapered protrusion 28 on the mounting member 16 is received.

The connection between the mounting plate 16 and the tubular handle 11 is formed by supporting the tubular handle in a suitable die clamp with the end portion protruding freely from the clamp such that the collar 30 may be located in a recess in the die clamp about the handle 11. Sufficient tube is left protruding from the collar, such that it may be flared outwardly by the tapered head 27 to locate within the tapered aperture 23 in the mounting plate 16. For this purpose the mounting plate 11 is located about the tube end 11 with the protrusion 28 engaged in the complementary tapered recess 33 whereby it self centers and aligns. The leading end of the billet 24 is then located in the tube 11 and the billet 24 is then pressed into the tubular handle 11 until the tapered head part 27 is firmly engaged within the tapered aperture 23. During this process, the intermediate part 26 expands the thin walled tubing and forces it outwardly into tight engagement with the collar 30 which has a greater resistance to expansion due to its thicker cross section. The diameter of the intermediate part 24 is so made that the degree of pressure exerted by the billet to cause deformation of the collar causes minimal plastic deformation and maximum elastic deformation of the collar. This maintains the collar in tension about the billet and tube end to provide a secure clamping ring about the handle 11. Furthermore the leading part 25 of the billet 24 extends inwardly beyond the deformed transition zone of the tubular handle to reinforce this portion of the handle which may be weakened by the cold working process.

In the preferred embodiment the collar 30 has a length which is slightly longer than the diameter of the collar. The collar may be cut from a length of tube in a lathe by feeding the cutting tool in at an angle of approximately forty five degrees to the axis of the tube. The one cutting action simultaneously provides the tapered faces 31 and 32 of adjacent collars. As shown in FIG. 5 the collar terminates at the transition zone 35 between the leading part 25 and the intermediate part 26 of the billet 24 so that its tapered inner end 32 is deformed by insertion of the billet to curve about the deformed transition portion of the tube 11.

The transition zone 35 in the billet between the leading and intermediate parts is tapered and is so formed as to provide a gradual transition to facilitate insertion of the billet 24 to the handle 11. Any suitable pressing action can be utilized to force the billet into the handle, provided sufficient force is utilized to flare the end of the tube 11 into the tapered recess 23 at the end of the pressing operation. This may be achieved by fast insertion of the billet using a press having a large excess of capacity beyond that normally required. Alternatively a jolt type pressing action similar to a fly press, or an air actuated punch may be used to force the head of the billet into the end of the tube. It will also be seen that the tapered head nests flush with the outer surface of the mounting member whereby the latter may support a flat blade.

As the joint is formed in a cold working process no surface finishing or cleaning is required. Thus the joint may be formed in a one press operation by unskilled labour or by a roboticised assembly plant. The formed joint will result in the secure retention of a relatively thick mounting plate to a thin walled tube. The cutting blade 14 may then be bolted to the mounting plate 16 through the cushioning member 22 to complete assembly of the implement. Furthermore as exact tolerances are not required between the collar and the tube, standard size tubing may be used for each.

It will be seen from the above construction that the weight of the weed chipping implement 10 is concentrated at the blade end of the implement. The blade is narrow and thin so that high cutting forces can be applied by the blade without a large effort on the part of the user. Furthermore the concentration of the weight at the cutting end of the blade enables the latter to be easily guided into contact with a weed to be removed so that the weed may be cut without disturbing the surrounding grass or soil. If desired the weighted end of the implement may be used to tamp down soil or lawn or the like. The long exposed side edges of the blade 14 may also be used to rake the cut weed to a convenient pick up point near the user's feet. The rubber cushioning pad 22 reduces the jarring effect transferred by the blade to the handle and this further increases the ease of use of the chipping implement.

Figure 7:
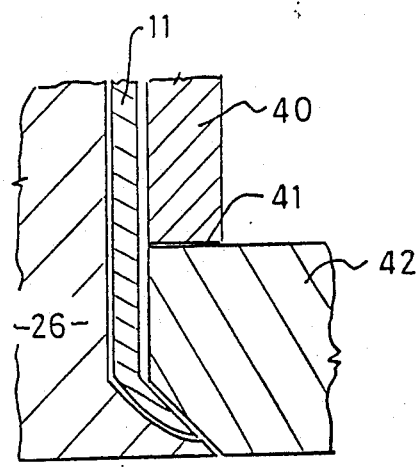
FIGS. 7 and 8 are further cross sectional views corresponding to FIG. 6 and illustrating further connecting arrangements between the tubular handle and the mounting member.
Figure 8:
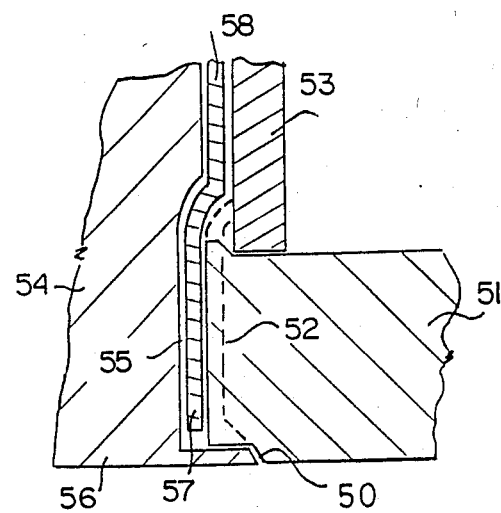
Figure 2:
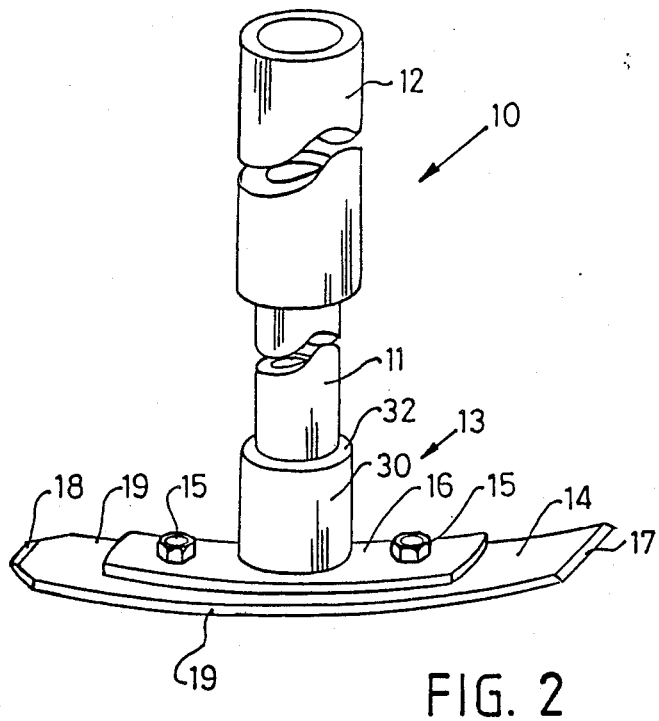
FIG. 2 is a broken away perspective view of the implement illustrated in FIG. 1.

FIGS. 7 and 8 illustrate alternate forms of the joint. The joint illustrated in FIG. 7 differs from the previously described embodiment in that the collar 40 is provided with a square outer end portion 41, as opposed to a tapered outer end portion, which is adapted to abut against the inside face of the mounting plate 42. Otherwise the joint is similar. However in the joint illustrated in FIG. 8, the aperture 50 in the mounting plate 51 is pressed or punched so that its peripheral portion is deformed as shown in dotted outline at 52 whereby the bore of the aperture 50 is substantially equal to the bore of the collar 53. Furthermore the insert billet 54 is provided with a recess 55 adjacent the head part 56 so that during the pressing operation additional pressure is applied to flatten the deformed peripheral portion 52 to cause it to move inwardly and press the outer end 57 of the tubular handle 58 into the recess 53 for secure retention therein.

It will of course be realised that the above has been given only by way of illustrative example of the present invention and that all such modifications and variations thereto as would be apparent to persons skilled in the art are deemed to fall within the broad scope and ambit of this invention as is defined in the appended claims.

I claim:

1. A gardening implement of the type having a lighweight tubular handle provided with a hand grip at its upper end and a mounting assembly at its lower end for a chipping blade disposed substantially normal to the axis of the handle, said mounting assembly including: an apertured elongate rectangular plate-like mounting member; a chipping blade detachably secured to said mounting member; a billet insert having an elongate body part which extends through a mounting aperture in said mounting member and into said tubular handle and an enlarged head part disposed externally of said handle which engages said mounting member about the periphery of said mounting aperture, and a separate external retaining sleeve supported about said lower end of said handle and frictionally retained in clamping engagement by said billet whereby, said mounting assembly is securely held together.

2. A gardening implement according to claim 1, wherein said retaining sleeve is a tapered annular sleeve and wherein said mounting aperture is correspondingly tapered and receives said retaining sleeve.

3. A gardening implement according to claim 2, wherein said body part is stepped and includes an inner end portion which slides freely within said tubular handle and an intermediate portion which retains said sleeve.

4. A gardening implement according to claim 3, wherein said chipping blade is a narrow rectangular blade which extends outwardly beyond said mounting member and wherein said mounting member is provided with fixing apertures spaced from said mounting member aperture whereby said blade may be bolted to said mounting means.

5. A gardening implement according to claim 4, wherein there is provided a resilient mounting pad interposed between said mounting member and said chipping blade.

6. A gardening implement according to claim 5, wherein the opposite ends of said narrow rectangular blade form opposed cutting edges.

7. A gardening implement according to claim 2, wherein said mounting aperture is dimensioned so as to fit closely about said lower end.

8. A method of securing a mounting member to the lower end of the lightweight tubular handle of the gardening implement defined in claim 1, the method including:
(a) forming a retaining sleeve to fit neatly about said lower end;
(b) placing said retaining sleeve on said lower end;
(c) forming an aperture in said mounting member whereby the latter may pass over said lower end and abut the annular end face of said retaining sleeve;
(d) forming an elongate billet has been inserted having: an inner end portion which fits neatly within said tube; an intermediate portion for fitting through said mounting aperture and enlarging said lower end when forced therein, and a head portion which will not pass through said mounting aperture;
(e) placing said mounting member over said lower end for support about said mounting aperture by said retaining sleeve, and
(f) forcing said billet has been inserted into said lower end until said head portion clamps said mounting member to said lower end.

* * * * *